United States Patent Office 3,208,863
Patented Sept. 28, 1965

3,208,863
PORTLAND CEMENT CONCRETE MASONRY UNITS AND PROCESS FOR PREPARING SAME
George H. Eick, Ponte Vedra Beach, James N. Stone, Jacksonville, and Robert P. T. Young, Ponte Vedra Beach, Fla., assignors to The Glidden Company, Cleveland, Ohio, a corporation of Ohio
No Drawing. Filed Feb. 11, 1964, Ser. No. 343,961
7 Claims. (Cl. 106—94)

This case relates to internally dosed Portland cement concrete of suppressed efflorescence and desirable texture and moisture resistance, to process for making same, and to structural Portland cement concrete units so made.

In the construction industry as relates to Portland cement concrete, one of the most difficult problems frequently arising is the suppression of efflorescence such as so-called "lime efflorescence," or "blooming." The most usually noticeable effect of efflorescence is the formation of an unattractive scaly or powdery white substance on the exterior surfaces of buildings. Generally, formation of this substance depends upon the aggregate used and upon the exposure of material to moist or humid conditions, as in the case of cement block which is conventionally cured in unprotected stacks placed outdoors in open lots. However, occurrence of this phenomenon is not limited by geographic boundaries but can occur even under generally semi-arid or arid conditions such as exist in the southwestern United States.

We have now found a convenient and inexpensive method for inhibiting Portland cement concrete efflorescence. Other advantages of our invention include economy, convenience of effective mixing, enhanced air entrainment, color and odor control and improved plasticity of the concrete for forming, as well as improved texture by imparting a more desirable waterweb. Further advantages, particularly to concrete masonry units such as block, include an increase in blocks per batch of concrete, quicker mold release and shorter compaction time, reduced aggregate segregation and reduction of curing shrinkage, improved texture on split surfaces, and desirable pigment uniformity in pigmented concrete.

Broadly our Portland cement concrete comprises the hardened product of an intimate mixture of aggregate, water, Portland cement, and from about 0.01–2.5%, on a basis of the weight of the aggregate, of a dispersion in water of about 30–70% of material selected from the group consisting of pinaceae heavy ends and asphalt extensions of said heavy ends; the dispersion contains about 0.1–5%, on a basis of the weight of the said heavy ends, of equivalent alkali metal hydroxide and about 0.1–15%, on the same weight basis of the said heavy ends, of protective colloid. The concrete mix, before curing to the hardened product, is made by mixing into Portland cement concrete in plastic state, the stated proportion of said dispersion.

Our invention also includes the above intimate mixture wherein the pinaceae heavy ends, during formation of the dispersion, have been extended by mixing with asphalt to as much as four times their weight, the asphalt having penetration between about 250 and 500 and softening point between about 85° and 140° F.

Another aspect of our invention comprises the hardened split-block product from our Portland cement concrete mixture. A still further aspect of our invention includes a Portland cement concrete surface of inhibited efflorescence and enhanced water resistance.

Hereinafter we will generally refer to the dispersion whether extended by asphalt addition or not, and including all dispersion ingredients, as the "admix," e.g. that component which is added and mixed into the Portland cement concrete or applied to a surface thereof. Upon mixing into the concrete and during and after curing of the concrete or after application on a concrete surface, the admix is "sorbed" on the concrete. By this we mean that the admix is chemically reacted with concrete or dehydrated by evaporation or absorption of water with concomitant deposition upon concrete particles and into interstices therein, or combination or adhesion by any other method. The resulting sorbed admix material will be referred to hereinafter as the "residue."

Most conventional aggregates are capable of producing at least some slight efflorescence. Although we do not mean to be bound by any particular theory of composition or deposition of efflorescence, apparently free lime, e.g. CaO combines with water to form $Ca(OH)_2$, or calcium hydroxide which then picks up $CO_2$ from the atmosphere to form $CaCO_3$. The $CaCO_3$ by gradual moisture seepage, reaches the surface of the concrete and is deposited upon evaporation. Washing of the surface does not easily effect scale removal as re-solution can be difficult and such washing does not prevent further deposits.

For our purposes an aggregate producing at least slight efflorescence can be a naturally occurring mineral aggregate, man-made aggregate or a mixture of such aggregates, which, when used in Portland cement concrete, yields at least slight visible exterior bloom or efflorescence on the surface of the concrete upon leaching of the concrete with water. Our invention is thus particularly applicable to all forms of concrete which can or will at some time exhibit this characteristic. Such aggregates include expanded shale and other shales used in the masonry industry, limestone, expanded slag, sand, dolomite crushed stone and gravel.

Efflorescence or the lack thereof can be discerned by testing concrete block in the manner of the efflorescence test for brick defined in ASTM Standards 1961, C67–70, paragraphs 21–35, inclusive, and rating the resulting block as "no efflorescence," "slightly effloresced" and "effloresced." For our purposes a concrete specimen is efflorescent if it is rated "slightly effloresced" by this test. Ordinarily, however, even slight efflorescence will be evident to an experienced observer on larger structures exposed to weather, and he can readily estimate the extent and distribution of it.

Additionally, we mean to include in the "Portland cement concrete" (hereinafter sometimes referred to simply as "concrete" or "design mix") such material as masonry cement or conventional concrete mortars, e.g., those which are generally made from ground limestone or other suitable materials such as gravel volcanic scoria, caliche rock, steel mill slag, etc., mixed with Portland cement and further mixed generally with sand and water to form mortar material. Thus, the beneficial effects from the Portland cement concrete can be exhibited in structural units and their binding mortars so as to benefit entire wall area. The building units most generally formed from our concrete are the conventional concrete blocks such as expanded shale, sand and gravel, expanded clay concrete block, and other blocks such as monumental and split block.

By pinaceae heavy ends we mean acid resins and acid pitches and tars, as well as mixtures of such various resins, pitches and tars obtained from the trees or portions thereof of the pinaceae family, e.g., pines, hemlocks, spruces, larches, balsams and firs, said acidic materials having sufficiently low vapor pressure to have boiling point not substantially below about 240° C. at 3 mm. Hg absolute. Thus, for example, suitable heavy ends are gum rosin, wood rosin, tall oil rosin, various rosin pitches and particularly for efficiency and economy, the high boiling fractions from the distillation of tall oil, e.g. tall oil rosin, tall oil pitch and their mixtures.

With respect to the constituents of such heavy ends tall oil rosin, for example includes mixtures of abietic and pimaric type acids and generally such related isomers as differ from abietic acid in either the number or location of the double bonds, or in the structure of the side chain. The rosin conventionally has an acid number between about 150–180. Pitches such as tall oil pitch, for example, can be at least partially composed of compounds formed during distillation such as polymerized resin acids. The acid number of tall oil pitch is conventionally not substantially above about 120 and the saponification number is often about 140 or lower.

We have found that blending pitch and rosin to form mixtures is desirable and is suitably accomplished prior to forming the dispersion. For efficiency and economy, we prefer mixtures wherein the pinaceae heavy ends consist of about 55–80 weight percent tall oil rosin and the balance tall oil pitch. Suitable mixtures can conveniently be obtained from distillation residue by conventional regulation of the distillate.

We prepare our admix from these pinaceae heavy ends according to such methods as have been previously disclosed in the paper sizing art and particularly with respect to the methods as have been described in U.S. Patent 1,882,680 to Wieger. This patentee describes a process of adding small amounts of alkali to a melted pine rosin to saponify a small portion of the rosin in preparation for forming what is generally termed a high free rosin size. The rosin so prepared is maintained at a temperature of about 80° to 90° C. while a solution of a protein and caustic soda is added followed by the addition of water to cool the resulting mixture. The water addition is conventionally continued to yield a paper size containing about 55% water. In our practice, we obtain dispersions having about 30–70% of dispersed material and for efficiency and economy prefer to form and use those containing about 45%.

For partial saponification of the pinaceae heavy ends and preparation of the protein solution, we use about 0.1–5%, on a weight basis of such heavy ends, of equivalent alkali metal hydroxide, e.g., an alkali metal hydroxide, such as sodium hydroxide, or equivalent water-soluble base or their mixtures. Such substances include potassium hydroxide, sodium carbonate, sodium aluminate, ammonium hydroxide, and generally any amine base such as an alkyl or alkanol amine suitable for neutralization such as triethanolamine.

For the stabilization of the resulting, warm dispersoid, we use about 0.1–15% of a protective colloid, the percentage being again figured on the weight of the pinaceae heavy ends. Colloids which we can and have used include casein, soya bean protein, egg albumin, gum arabic, starch, gelatin, water soluble methyl cellulose, animal glue, dextrines, and sodium alginate.

For added storage life of the protective colloid in the admix we can use a pesticide such as a fungicide generally in proportion of about 0.01 to 1.0% of fungicide based on the total weight of the admix. Fungicides which we can and have used include phenyl mercury acetate, "Vancide" (which is the trademark for an aqueous solution of the salts of mercaptobenzothiazole and dimethyldithiocarbamic acid), and N-(3-chloroallyl)hexaminium chloride, made by reacting hexamethylenetetraamine with a halohydrocarbon. For efficiency and economy we prefer to use about 0.2% of N-(3-chloroallyl)hexaminium chloride. Additionally, odorants can be used in the admix to mask or enhance dispersion odors, if desired, although the dispersion can be made virtually non-offensive without them.

Often we form extended admixes by starting with asphalt-pitch, asphalt-rosin, etc. mixtures. In such mixtures we can and have used as much as four times as much by weight of asphalt as of the pinaceae heavy ends. Suitably for best dispersion stability we mix asphalt in the pinaceae heavy ends and before such heavy ends are used in the make-up of the dispersion. We thereby ensure the retention of basic dispersion physical characteristics and retain further desirable features such as economy and ease of mixing with masonry materials.

However, on exterior coatings of admixes, such as produced by brushing, spraying or dipping we find that the asphalt-extended admixes generally exhibit a darkening, thus a sometimes inesthetic appearance. Inasmuch as our invention provides for color control, we can formulate dispersions of virtually water white appearance by using pale rosins. Thus we can produce masonry material free from such color bodies when required. Accordingly, particularly for coatings, we prefer to use unextended admixes.

When extending the pinaceae heavy ends with asphalt for forming admixes, we use not more than about four times by weight of asphalt to avoid marked discoloration of the resulting concrete, particularly structural units such as concrete block. Additionally greater proportions of asphalt can produce undesirable tackiness that leads to inefficiency in handling and storage of the block. Preferably, for efficiency and economy we use about 35–65 weight percent of asphalt on a total asphalt plus heavy ends basis where such extension is desired.

In our asphalt extensions, we do not means to include by "asphalt" such refractory substances which can be uneconomical to handle such as gilsonite or glance pitch, but rather we mean those species of bitument of native or pyrogenous origin having dark color, and such species as are generally non-volatile and largely soluble in carbon disulfide; they are preponderantly free from oxygenated bodies, yield water insoluble sulfonation products and can vary to the touch from adherence to non-adherence.

The asphalt should exhibit a penetration between about 250 and 500 and a softening point between about 85° and 140° F., e.g., it should not be so refractory or difficult to soften as to present problems in forming stable dispersions and dispersions of good shelf life, while on the other hand, it must not exhibit undue fluidity that would cause the asphalt to separate and form a separate fluid layer. For efficiency and economy, we prefer to use an asphalt having a softening point between about 94° and 100° F., such as determined by a ring and ball method as detailed in ASTM D36-26, and preferably such asphalt should have a penetration between about 375 and 400, e.g., a consistency expressed as the vertical distance in hundredths of a centimeter that a standard 50 gm. needle with a 50 gm. load penetrates a sample under such conditions as disclosed in ASTM D5-61 for Penetration of Bituminous Materials.

Our admixes generally are dispersions of small particle size, e.g. they have average particle size within the about one to two micron range. We find that usually not more than 1–2% of the dispersed particles have a diameter greater than 10 microns, and we prefer to have a preponderant portion, i.e. about 75–80% of our additive particles within a size range of 1–2 microns for fluidity and stability of the admix.

We add to the concrete about 0.01–2.5% of admix calculated on a basis of the weight of aggregate present in the concrete, in such manner as to form an intimate mixture of good uniformity and dispersability. Using less than about 0.01% is inefficient for obtaining water-repellency or for retarding efflorescence and using greater than 0.01% insures improved concrete production, particularly with respect to the production of increased yield of block. Mixing in greater than about 2.5% of admix can produce plastic deformation, also called "slump," in concrete such as in "green" or uncured concrete blocks. Moreover, using greater than about 2.5% can interfere with the formation of adequate compressive strength in cured concrete material and reduce this strength below tolerable limits. For efficiency and economy, we prefer to mix in the concrete from about 0.025–2% admix.

To be an effective suppressant of efflorescence in such small proportions, the admix must be easily and thoroughly mixed with the concrete batch. Because our product is in a dispersed state, it blends quickly and efficiently with the plastic concrete in the normal mixing operation, machine or hand, as distinguished from an oily material, and practically uniform distribution is obtained.

In split block, e.g. cured block which has been guillotined into two or more pieces, thereby forming split surfaces which are generally exposed for architectural purposes, our admix imparts enhanced texture to the exposed surfaces. Texture improvement is exhibited by reduction in pits, voids, and "balling" generally on all block surfaces but particularly on split surfaces, to form a less spongy looking face, which face can have attractive appearance often simulating Indiana limestone. Furthermore, when admix-containing blocks are pigmented, those that are split will effectively demonstrate the good pigment dispersing ability of the admix by exposing split surfaces which have homogeneous color intensity. Suitable pigments compatible with concrete include, as for example, ferric oxide and ferrite yellow pigments as well as additional iron oxide pigments and different hues made from mixtures thereof.

The following examples show ways in which the invention has been practiced, but should not be construed as limiting the invention. All parts used therein and not otherwise specifically detailed are parts by weight and all temperatures are in degrees centigrade unless otherwise specified.

*Example 1*

A 330 gram sample of tall oil rosin having 90.5% free any combined rosin acids, 6.5% unsaponifiables, 3% fatty acids, an acid number of 163, a saponification number of 167, and a color of WG according to ASTM D509–55 for Sampling and Grading Rosin, was melted in a kettle equipped with a thermometer and stirrer and the temperature stabilized at 130°. A solution of 5.4 grams of NaOH in 10 ml. of water was added to the rosin sample for reaction therewith.

Next 7 grams of casein were soaked in 25 ml. of water at room temperature for 10 minutes. While stirring, the casein slurry was combined with 1.3 grams of a 50% NaOH solution and the resulting mixture heated slowly to 70°. When the casein was completely dispersed to a uniform mixture, sufficient tap water was added to bring the total mixture volume to 85 ml. The resulting dispersion was allowed to cool to 32°, then mixed with 1.3 additional grams of 50% NaOH solution to form a final casein dispersion.

The resulting casein-NaOH dispersion was poured into the partially saponified tall oil rosin, which had first been cooled from 130° down to 100°, the combining being done at first very slowly until a drop in the level of the contents of the kettle was observed. The remaining dispersion was then poured in at a faster rate. During the addition the temperature in the kettle was held above 86°. After all of the casein-NaOH dispersion was added, the mixture was allowed to cook for 10 minutes at a temperature of 90°.

After cooking, warm water at a temperature of 38° was added to the mixture with agitation to form a stable aqueous mixture having a continuous aqueous phase and to reduce the mixture to a 45% total solids content. Over 70% of the solids had particle size of 1–2 microns or less. As the viscosity of the mixture decreased, cooler water could be used if desired. Based on the total weight of the admix, 0.2% of a fungicide, which was N-(3-chloroalkyl)hexaminium chloride, was added. The above complete procedure was repeated, except in greater quantity, to produce a large batch of resultant mixture for subsequent use with concrete. The resulting batch is hereinafter called the "admix."

A mixture was prepared from 470 parts Portland cement, an aggregate of 2487 parts sand and 1243 parts gravel. This mixture was added in portions to the batch mixer and mixed with water to form a plastic cohesive mass. All portions were mixed for 6 minutes in the batch mixer. Some portions in the mixer were dosed with 0.25%, 0.7%, and 1.9% of admix, respectively, based on the dry weight (no added moisture) of the aggregate. The remaining concrete portions were used for control purposes. Standard 8" x 8" x 16" 2-core concrete blocks were produced from all concrete design mixes. Resulting blocks were steam cured at 160° F. for 24 hours, then air cured for 28 days. Blocks were checked for freedom from chips, cracks, etc. according to the general specifications of ASTM C90–59 for Hollow Load-Bearing Concrete Masonry Units and more particularly (in accord with the above general specifications) according to the procedures for compressive strength and water absorption outlined in ASTM C140–56.

These blocks were exposed out-of-doors and periodically checked for efflorescence. Over a nine-month period no evidence of efflorescence was detected on those blocks containing admix whereas bloom had begun to appear on control blocks after only 4–5 weeks' outside exposure. Additionally, because of the admix, e.g. its water repellant attributes and cohesive nature, a random sample of admix blocks easily met the general specifications of ASTM C90–59 as well as the compressive strength and water absorption and specifications of ASTM C140–56, whereas a random sample of the controls evidenced a maximum moisture content, measured as percentage of total absorption for an average of a five block sample, of greater than 40 and thus above the maximum ASTM C140–56 specification.

*Example 2*

Admix was prepared in the manner of Example 1 and in the proportions of Example 1 but in a much larger batch and in place of the tall oil rosin there was used tall oil pitch having 28% free rosin acids, 29% unsaponifiables, 6% fatty acids, an acid number of 55, and a saponification number of 110; and this was initially heated to a temperature of 120°.

In the batch mixer, the pitch admix was added internally to the design mix in proportions of 0.25%, 1.25%, 2.0% and 2.5%, on a basis of dry aggregate weight, to randomly selected batches and the remaining batches were used for control purposes. Mixing time was 7 minutes for each mixer batch. Concrete blocks were prepared as in Example 1.

Again visual inspection over a nine-month period disclosed no efflorescence on blocks containing the pitch admix as opposed to control blocks containing no admix, twenty-five percent of which showed a powdery white-scale formation on exterior surfaces. Additionally, a random sample of admix blocks showed good water resistance and repellancy and met ASTM C90–59 and ASTM 140–56 specifications; whereas a random sample of the controls exceeded the maximum moisture content allowable as explained in Example 1.

*Example 3*

A rosin-pitch admix was prepared in the manner of Example 1 and in accordance with the proportions of Example 1 but in a much larger batch. Also instead of an initial starting material of tall oil rosin, a mixture of the tall oil rosin of Example 1 and the tall oil pitch of Example 2 was used in a ratio of tall oil rosin to tall oil pitch of 7:3. The resulting rosin-pitch admix had a 45% total solids content and was a stable dispersion having a continuous aqueous phase and an average particle size in the range of 1–2 microns.

In the batch mixer, the resulting admix was mixed into three randomly selected concrete design mix batches in proportions of 0.1%, 0.2% and 0.4%, on a basis of dry aggregate weight; the remaining five batch mixer portions were used for control purposes. Total mixing time for all batches was 7 minutes. Concrete blocks were prepared as in Example 1. After 6 months outdoor storage, admix blocks were found upon visual inspection to have no efflorescence; whereas an average of about 1 out of every 4 control blocks showed signs of scale formation on exterior surfaces. Admix blocks were also found to have more uniform and less spongy exterior texture and appearance. Furthermore, a random sample of admix blocks showed good water repellancy and met ASTM C90–59 and ASTM C140–56 specifications.

*Example 4*

Ten batches of blocks were prepared, each batch containing 900 lbs. gravel, 3500 lbs. sand, and 370 lbs. of Type 1 Portland cement. Each batch was mixed two minutes dry and four minutes wet. Selected batches were treated in the mixer with the admix of Example 3 in amounts of 0.085–0.33% based on the weight of the dry aggregate. From all batches 8" x 8" x 16" 2-core concrete blocks were prepared and air cured for 28 days.

Randomly selected blocks were tested for lineal drying shrinkage in accordance with the test defined in ASTM C426–61T. Based on a total of the four control blocks tested and seven admix blocks tested, the admix blocks representing admix contents of 0.085–0.33%, it was found that the admix blocks showed an average of 18% less lineal drying shrinkage than the control blocks.

*Example 5*

Concrete blocks were prepared in batches, each batch containing 3300 lbs. sand, 1350 lbs. limestone, and 450 lbs. of high early strength Portland cement. The mixing time was two minutes dry and five minutes wet for each batch. A total of 17 batches were run; 6 control batches contained no admix and 11 batches contained the admix of Example 3, which was used for treatments from 0.2%–0.4%, based on the dry weight of the aggregate used. From each batch, 8" x 8" x 16" 2-core blocks and a few 3-core blocks were prepared and air cured for a period of 28 days.

During the course of this run a physical count showed that the 6 control batches yielded an average of 132 blocks per batch versus an average yield of 135 blocks per batch for the admix batches on a comparable block type and size basis.

Selected specimens of control and admix blocks were retained and stored outside. Upon visual inspection after only five weeks, five control samples showed definite evidence of lime efflorescence whereas no trace of lime efflorescence was noted on admix specimens.

*Example 6*

Standard 8" x 8" x 16" 2-core blocks were prepared from concrete batches produced from 875 parts sand, 275 parts stone, and 125 parts Portland cement. All blocks were steam cured at 185° F. for 15¾ hours.

Selected blocks were coated with the rosin-pitch admix of Example 3, allowed to dry, and set outdoors to cure along with the uncoated blocks. The admix demonstrated ease of brushability in application to the blocks and achieved good hiding power without producing pin-holes or fish-eyes. After four months of outdoor curing, no noticeable efflorescence was detected on any of the blocks having the applied coating, whereas control blocks having no coating had already begun to show white patches or blooming.

*Example 7*

A tall oil rosin admix was prepared in the manner of Example 1 and in accordance with the proportions of Example 1 but in a much larger batch to form a stable mixture of 45% total solids content. However, the starting material was a 40/60 rosin to asphalt mixture in place of the unextended tall oil rosin of Example 1. The asphalt had 95% ether extractables, a softening point of 98° F., and a penetration of 385. The resulting mixture was a completely stable dispersion having a continuous aqueous phase with more than 75% of the solids having particle size within the range of 1–2 microns or less. This resulting dispersoid contained 40% rosin and 60% asphalt on a total solids basis.

A mixture was prepared from 15 parts Portland cement, an aggregate of 875 parts sand (classified as 2NS, Besser Technical Center, Alpena, Michigan), and 375 parts stone (classified as 31B, Besser Technical Center, Alpena, Michigan). Portions of this design mix were passed successively to a batch mixer and all portions were mixed two minutes dry followed by addition of tap water and further mixing of five minutes wet. Total overall tap water addition was 89.6 parts. Randomly selected portions in the batch mixer were extended, during the water addition, by mixing in 0.222%, 0.444%, and 0.888%, all on an aggregate weight basis, of the asphalt extended admix and the remaining portions were used for control purposes. Standard 8" x 8" x 16" 2-core concrete blocks were produced from all portions and steam cured at 185° F. for 14½ hours.

Blocks containing admix evidenced no visual efflorescence on periodic inspection over a 12-month period while exposed outside. In contrast about one out of every four control blocks showed efflorescence or blooming on exterior surfaces thus producing an unsightly surface appearance.

Additionally, water repellancy tests on blocks cured 14 days were run. Blocks were placed on their sides so that the hollow block core holes were horizontal, and the blocks then leveled. In such a position, 0.6 cc. of water at 70° F. was placed by dropper on the approximate center of the block area over each core hole, e.g., two puddles of water per block, the eye-dropper initially touched the block surface and then was slowly raised as water ejected. The water on the control blocks disappeared immediately below the surface of the block thus demonstrating complete lack of water repellancy for these blocks. Blocks treated with 0.444% and 0.888% of admix showed water repellancy for 25 minutes up to 2 hours plus (which was as long as the test if normally run) and blocks treated with only 0.222% of admix showed repellancy from 2–10 minutes on some block surfaces, and up to an hour or more on others, thus demonstrating the high degree of repellancy achieved by admix blocks. Furthermore, all admix containing blocks easily met ASTM C140–56 specifications.

*Example 8*

Dry design mixes were prepared from 208 parts Portland cement and an aggregate of 1300 parts Drummond Island dolomite. These mixtures were proportioned to a batch mixer and all batches were mixed two minutes dry and five minutes wet. An average of 45 pounds of water per batch was added. Selected batches were treated in the mixer with the rosin-pitch admix of Example 3 in amounts of 0.3–0.6% on an aggregate weight basis. Further selected batches were treated with 0.5% calcium stearate on an aggregate weight basis and other batches were untreated for control purposes.

The remaining batches were combined with rosin-pitch admix as well as ferric oxide pigment. The pigment was first added to the design mix in the batch mixer followed by admix addition. The resulting mix contained 1.6% pigment on an aggregate weight basis. The blocks produced from all batches were a commercial solid type that are conventionally split after curing. All blocks were divided into two numerically equal portions; one portion was cured in an autoclave at 365° F., for a period of 5 hours; the other was cured in an atmospheric kiln at 195° F., for 16 hours.

Randomly selected samples from all batches and from both portions of cured blocks were conventionally split by impact from a guillotine-like power-actuated blade to produce split block. The fresh split surfaces on all samples were checked visually. Control blocks containing no additives as well as blocks containing calcium stearate were found to have pits and voids on the split surfaces. These samples exhibited a spongy, high porosity texture. All admix blocks on the other hand were virtually free from these characteristics, and those admix blocks that were not pigmented displayed unpigmented split surfaces of enhanced appearance resembling Indiana limestone in texture and color. Additionally, samples of pigmented block showed desirable texture as well as uniform distribution of pigment on all surfaces, including the internal split surfaces, thus demonstrating the desirable pigment dispersing ability and/or wettability of the admix used.

Additionally, samples of control blocks and admix blocks were tested for water-repellency in accordance with the procedures outlined in Example 7. The control blocks showed no repellency whatsoever, whereas the water puddles on the surface of the admix blocks remained visible above the surface for two hours and longer. After extended outdoor exposure the block samples were inspected visually. Only the blocks containing our admix had no detectable efflorescence.

We claim:

1. The method of making Portland cement concrete of inhibited efflorescence and enhanced moisture resistance upon curing which comprises mixing aggregate, water, Portland cement, and, basis weight of said aggregate, about 0.2–2.5% of a dispersion in water of about 30–70% of pinaceae heavy ends material selected from the group consisting of rosin, pitch, and mixtures thereof, said pinaceae heavy ends being extended with 0–4 parts of asphalt having penetration between about 250 and 500 and softening point between about 85° and 140° F., said dispersion containing about 0.1–5%, basis weight of said pinaceae heavy ends, of equivalent alkali metal hydroxide and about 0.1–15%, basis weight of said pinaceae heavy ends, of protective colloid.

2. The method of claim 1 wherein said dispersion is prepared from pinaceae heavy ends consisting essentially of tall oil pitch.

3. The method of claim 1 wherein said dispersion is prepared from pinaceae heavy ends consisting essentially of tall oil rosin.

4. The method of claim 1 wherein said dispersion is prepared from pinaceae heavy ends consisting essentially of about 55–80 weight percent tall oil rosin and about 20–45 weight percent tall oil pitch.

5. The method of claim 1 wherein said dispersion is prepared with about 0.1–5%, basis weight of said pinaceae heavy ends, of equivalent sodium hydroxide and a preponderance of particles in said dispersion are within the about 1–2 micron size range.

6. The method of making a Portland cement concrete structural unit having inhibited efflorescence and enhanced moisture resistance upon curing which comprises mixing aggregate, water, Portland cement, and, basis weight of said aggregate, about 0.2–2.5% of a dispersion in water of about 30–70% of pinaceae heavy ends material selected from the group consisting of rosin, pitch, and mixtures thereof, said pinaceae heavy ends being extended with 0–4 parts of asphalt having penetration between about 250 and 500 and softening point between about 85° and 140° F., said dispersion containing about 0.1–5%, basis weight of said heavy ends, of equivalent alkali metal hydroxide and about 0.1–15%, basis weight of said pinaceae heavy ends, of protective colloid, forming and compacting at least a portion of the resulting mixture in a mold so as to shape said structural unit, separating the mold from the shaped unit, and curing said shaped unit.

7. A Portland cement concrete surface of inhibited efflorescence and enhanced moisture resistance comprising a Portland cement concrete surface coated with the residue from a dispersion in water of about 30–70% of pinaceae heavy ends material selected from the group consisting of rosin, pitch, and mixtures thereof, said pinaceae heavy ends being extended with 0–4 parts of asphalt penetration between about 250 and 500 and softening point between about 85° and 140° F., said dispersion containing about 0.1–5%, basis weight of said pinaceae heavy ends, of equivalent alkali metal hydroxide and about 0.1–15%, basis weight of said pinaceae heavy ends, of protective colloid.

References Cited by the Examiner

UNITED STATES PATENTS

| | | | |
|---|---|---|---|
| 930,697 | 8/09 | Schoellkopf | 106—94 |
| 1,752,214 | 3/30 | Westrum | 106—96 |
| 1,882,680 | 10/32 | Wieger | 106—94 |
| 2,122,192 | 6/38 | Batcheller | 106—96 |
| 2,354,156 | 7/44 | Sucetti | 106—94 |
| 2,355,966 | 8/44 | Goff | 106—94 |
| 2,370,983 | 3/45 | Miller | 106—94 |
| 2,420,144 | 5/47 | Mark | 106—94 |
| 2,483,806 | 10/49 | Buckley | 106—96 |
| 2,510,776 | 6/50 | Gabrielson | 106—86 |
| 2,521,073 | 9/50 | Ludwig | 106—94 |

TOBIAS E. LEVOW, *Primary Examiner.*

UNITED STATES PATENT OFFICE
CERTIFICATE OF CORRECTION

Patent No. 3,208,863September 28, 1965

George H. Eick et al.

It is hereby certified that error appears in the above numbered patent requiring correction and that the said Letters Patent should read as corrected below.

Column 4, line 27, for "means" read -- mean --; column 5, line 35, for "any" read -- and --; column 8, line 8, for "15 parts" read -- 125 parts --; column 10, line 29, after "asphalt" insert -- having --.

Signed and sealed this 19th day of April 1966.

(SEAL)
Attest:

ERNEST W. SWIDER
Attesting Officer

EDWARD J. BRENNER
Commissioner of Patents